United States Patent
Okamoto et al.

(10) Patent No.: US 8,353,558 B2
(45) Date of Patent: Jan. 15, 2013

(54) LIFTER DEVICE FOR VEHICLE SEAT

(75) Inventors: Masafumi Okamoto, Hiroshima (JP); Ryota Okimoto, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 351 days.

(21) Appl. No.: 12/844,549

(22) Filed: Jul. 27, 2010

(65) Prior Publication Data

US 2011/0025106 A1 Feb. 3, 2011

(30) Foreign Application Priority Data

Jul. 30, 2009 (JP) .................................. 2009-177299

(51) Int. Cl.
*B60N 2/427* (2006.01)
*A47C 3/20* (2006.01)

(52) U.S. Cl. .................. 297/216.1; 297/344.15
(58) Field of Classification Search ............ 297/344.15, 297/216.2, 216.19, 216.18, 216.16, 216.1, 297/325, 313, 216.15

See application file for complete search history.

(56) References Cited

U.S. PATENT DOCUMENTS

| 5,022,707 | A | * | 6/1991 | Beauvais et al. | ............ 297/216.2 |
| 5,110,182 | A | * | 5/1992 | Beauvais | ................. 297/216.11 |
| 5,967,604 | A | * | 10/1999 | Yoshida et al. | .......... 297/216.19 |
| 6,276,650 | B1 | | 8/2001 | Kojima et al. | |
| 7,338,118 | B2 | * | 3/2008 | Ichikawa et al. | ............ 297/216.1 |
| 2001/0045766 | A1 | * | 11/2001 | Deptolla | .................... 297/216.2 |

FOREIGN PATENT DOCUMENTS

| JP | 56-105449 | 8/1981 |
| JP | 2000025502 | 1/2000 |
| JP | 2002321551 | 11/2002 |

* cited by examiner

*Primary Examiner* — Milton Nelson, Jr.
(74) *Attorney, Agent, or Firm* — Gerald E. Hespos; Michael J. Porco

(57) ABSTRACT

A vehicle seat lifter includes front and rear links with upper ends pivoted to a side frame of the seat and lower ends pivoted to front and rear floor brackets. A front hitting segment is in a front portion of the side frame spaced from a front catch in the front bracket, and a rear hitting segment is in a rear portion of the side frame spaced from a rear catch in the rear bracket. The front hitting segment is stopped by the front catch when the side frame is displaced frontward along with a deformation of the front and rear links due to forces during a frontal collision. The rear hitting segment is stopped by the rear catch when the side frame is displaced rearward along with a deformation of the front and rear links due to forces during a rear collision.

4 Claims, 4 Drawing Sheets

LIFTER DEVICE FOR VEHICLE SEAT

BACKGROUND OF THE INVENTION

1. Field of the Invention

The present invention relates to a lifter device for a vehicle seat.

2. Description of the Related Art

A lifter device for a vehicle seat is designed such that it has front and rear links each coupling a frame of a seat cushion and a floor member (a floor panel or an upper channel mounted to the floor panel), and lifts and lowers the seat cushion according to a swing movement of the front and rear links (see, for example, JPU 56-105449A). This makes it possible to adjust a height position of a seating surface of the seat cushion.

Meanwhile, in the event of a frontal collision of a vehicle, a frontward displacement force will occur in the seat cushion by collision energy, whereas, in the event of a rear collision of the vehicle, a rearward displacement force will occur in the seat cushion by collision energy.

In the event of the collision, if the seat cushion is in a lifted position, a deformation (buckling) of the link become larger, because the link is raised more uprightly than when the seat cushion is in a lowered position, so that an amount (distance) of frontward or rearward displacement of the seat cushion becomes larger. This results in an increase in amount (distance) of displacement of an occupant seated on the seat cushion, and an increase in acceleration to be applied to the occupant.

SUMMARY OF THE INVENTION

In view of the above circumstances, it is an object of the present invention to provide a vehicle seat lifter device capable of reducing acceleration to be applied to an occupant when a displacement force occurs in a seat cushion due to a frontal or rear collision, to provide higher safety.

In order to achieve the above object, the present invention provides a lifter device for a vehicle seat, which is designed to lift and lower a seat cushion with respect to a floor member provided on a floor of a vehicle body. The lifter device comprises: a pair of front and rear links each coupling a side frame of the seat cushion and the floor member; a front bracket and a rear bracket each of which is fixed to the floor member and to which respective lower ends of the front link and the rear link are swingably coupled; a front hitting segment formed in a front portion of the side frame and located in spaced-apart relation to a front catch segment formed in the front bracket, the front hitting segment having a shape conforming with that of the front catch segment; and a rear hitting segment formed in a rear portion of the side frame and located in spaced-apart relation to a rear catch segment formed in the rear bracket, the rear hitting segment having a shape conforming with that of the rear catch segment, wherein: when the side frame is displaced in the frontward direction along with a deformation of the front and rear links due to an impact force during a frontal collision, the front hitting segment of the side frame is caught and stopped by the front catch segment of the front bracket; and when the side frame is displaced in the rearward direction along with a deformation of the front and rear links due to an impact force during a rear collision, the rear hitting segment of the side frame is caught and stopped by the rear catch segment of the rear bracket.

DETAILED DESCRIPTION OF THE PREFERRED EMBODIMENTS

Figure 1:
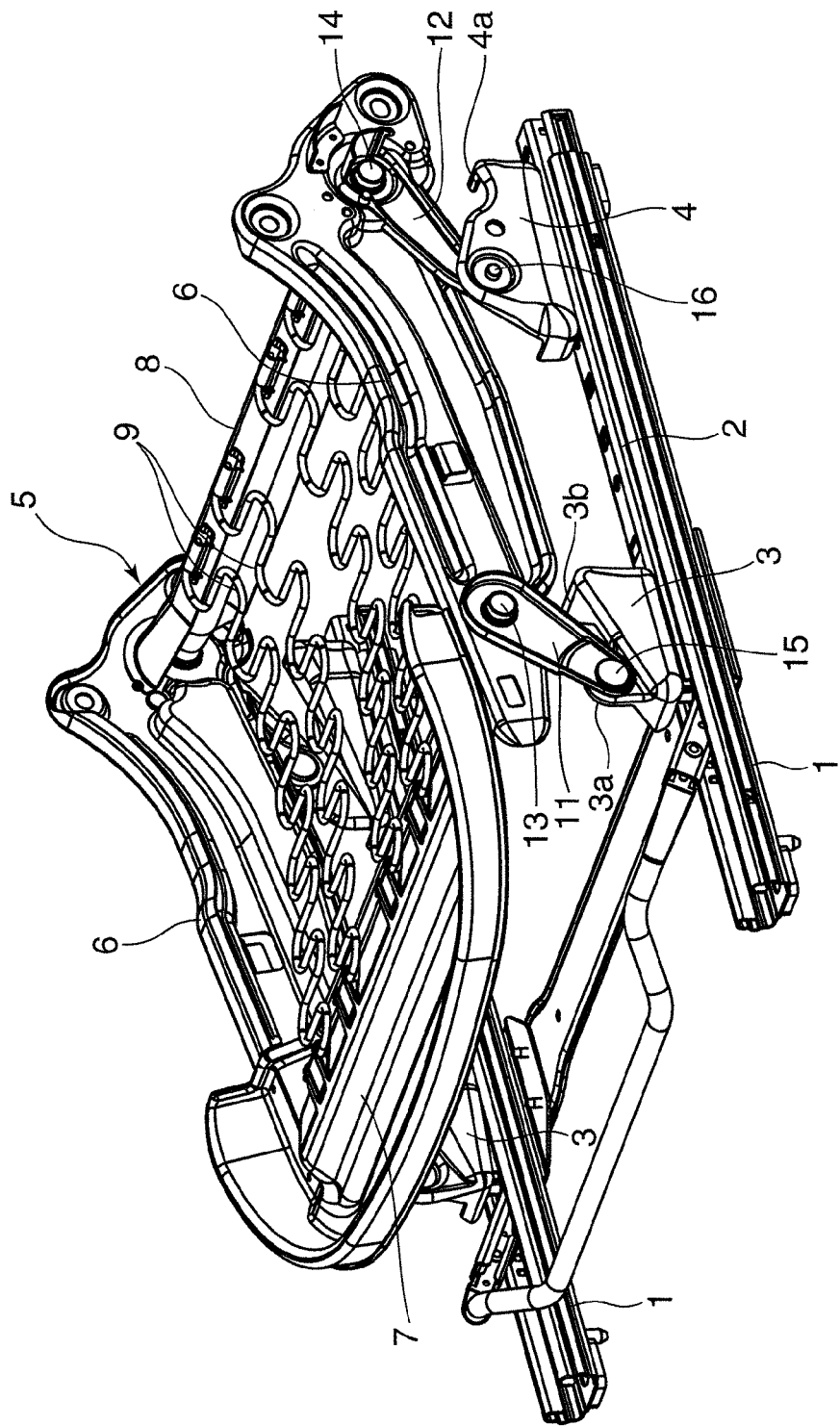
FIG. 1 is a perspective view of a vehicle seat having a lifter device according to one embodiment of the present invention, wherein a seat back is omitted, and only a frame member of a seat cushion is illustrated.
Figure 2:
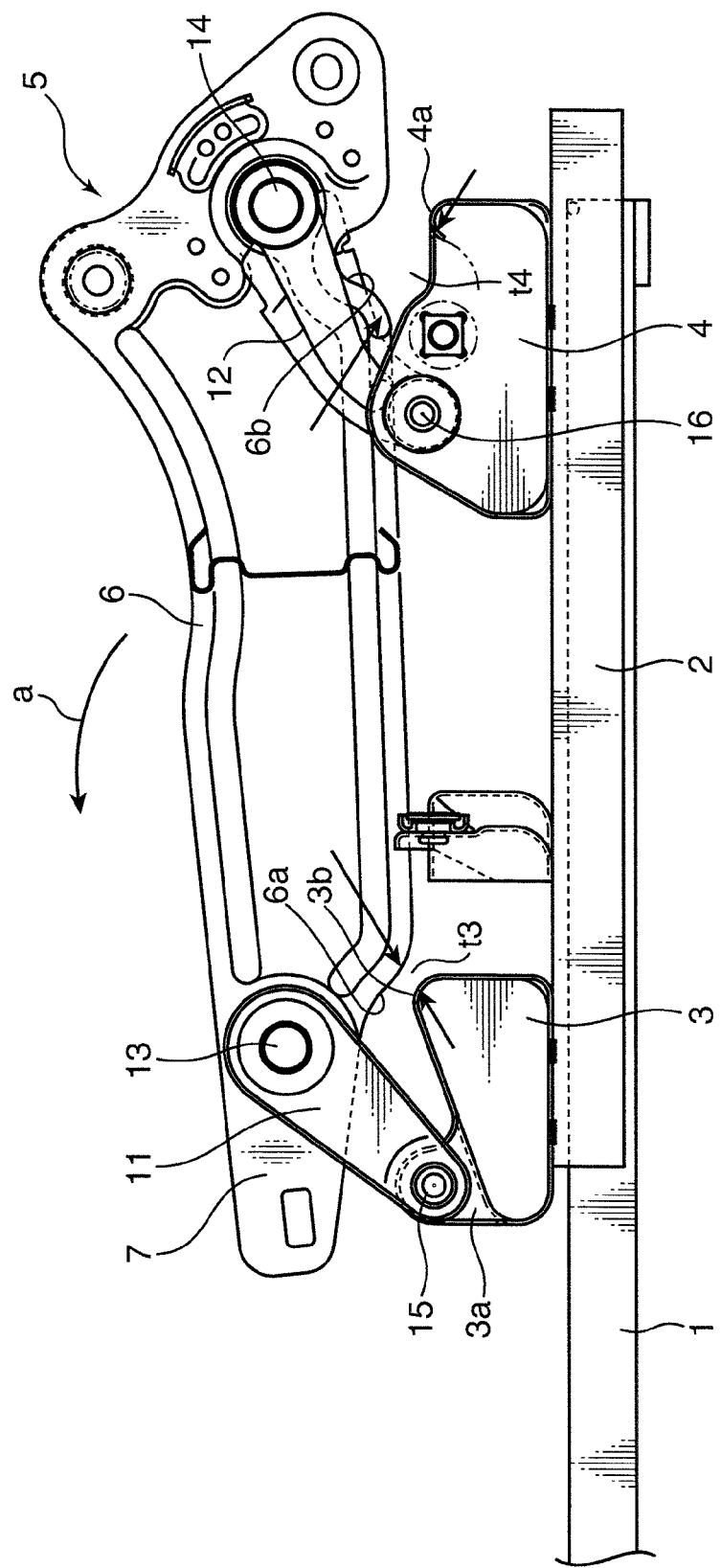
FIG. 2 is a side view of the vehicle seat, wherein the lifter device is in a lifted position.
Figure 3:
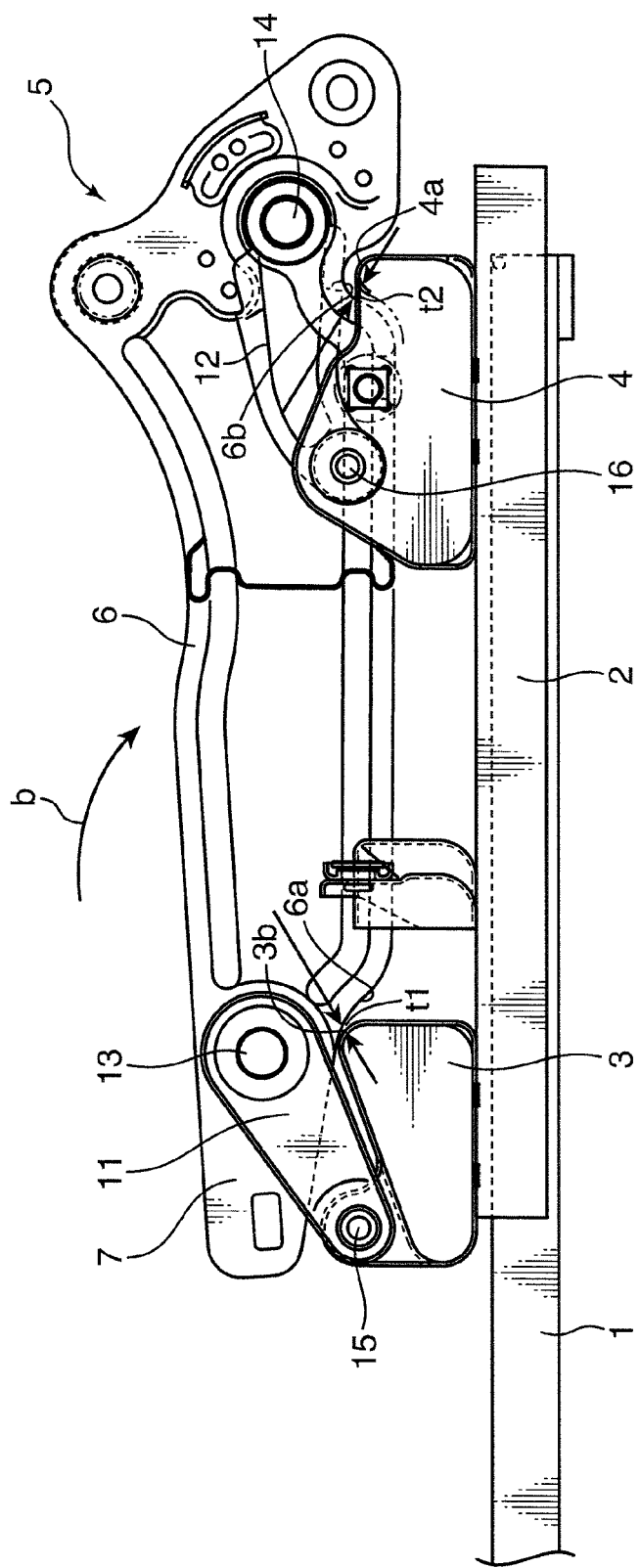
FIG. 3 is a side view of the vehicle seat, wherein the lifter device is in a lowered position.

With reference to the drawings, the present invention will now be specifically described based on an embodiment thereof. FIG. 1 is a perspective view of a vehicle seat having a lifter device according to one embodiment of the present invention, and FIGS. 2 and 3 are side views of the vehicle seat. In FIGS. 1 to 3, a seat back is omitted, and only a frame member of a seat cushion is illustrated.

The lifter device is designed to lift and lower the seat cushion, and displaceable between a lifted position where the seat cushion is lifted, and a lowered position where the seat cushion is lowered. FIGS. 1 and 2 show a state when the lifter device is in the lifted position, and FIG. 3 shows a state when the lifter device is in the lowered position.

A pair of right and left lower channels 1 each extending in a frontward-rearward direction of a vehicle body (not shown) are fixed to a floor panel (not shown) of the vehicle body. A pair of upper channels 2 are fitted in respective ones of the lower channels in a slidable manner in the frontward-rearward direction. The combination of the lower channel 1 and the upper channel 2 makes up a slider (seat slide rail) to allow the seat to be moved in the frontward-rearward direction.

A front bracket 3 and a rear bracket 4 are fixed to an upper surface of each of the upper channels 2 at a front position and a rear position of the upper surface, respectively. Otherwise, if the seat is a type devoid of the slider, the front bracket 3 and the rear bracket 4 are fixed to the floor panel of the vehicle body.

As above, if the seat is a type having the slider, the front bracket 3 and the rear bracket 4 are fixed to the upper channel 2, whereas, if the seat is a type devoid of the slider, they are fixed to the floor panel. In other words, the upper channel 2 or the floor panel channel falls into a concept of the term "floor member" set forth in the appended claims.

A cushion frame 5 as the frame member of the seat cushion is disposed in a position above the upper channels 2. This cushion frame 5 is composed of right and left side frames 6, a front frame 7 and a rear frame 8, and formed in a quadrilateral frame shape. Further, an S-shaped spring 9 is engagedly fixed to each of the front frame 7 and the rear frame 8 to extend therebetween so as to elastically support a pad member (not shown) of the seat cushion.

Each of the side frames 6 of the cushion frame 5 and a corresponding one of the upper channels 2 are coupled to each other by a pair of front and rear links 11, 12 arranged in the frontward-rearward direction. Specifically, an upper end of the front link 11 and an upper end of the rear link 12 are swingably coupled to an outer surface of the side frame 6 at a front position and a rear position of the outer surface through a link pin 13 and a link pin 14, respectively. A lower end of the front link 11 is swingably coupled to an outer surface of an upstanding sub-portion 3a of a front portion of the front bracket 3 through a link pin 15, and a lower end of the rear link 12 is swingably coupled to an inner surface of a front portion of the rear bracket 4 through a link pin 16.

Thus, when the front and rear links 11, 12 are swingingly moved by a manual or electrical operation, the seat cushion (cushion frame 5) is lifted while being moved frontwardly, as indicated by the arrowed line a in FIG. 2, or lowered while being moved rearwardly, as indicated by the arrowed line b in FIG. 3.

A rear portion of the front bracket 3 is formed in a shape rising obliquely rearwardly in side view, and a front catch segment 3b (see FIG. 1) is integrally formed in an upper end of the rear portion, i.e., a rear upper portion of the front bracket 3, to protrude laterally (inwardly in a widthwise direction of the seat). Specifically, a wall plate of the rear upper portion of the front bracket 3 is largely extended to protrude to a position inward of the front link 11 in the widthwise direction of the seat, and the front catch segment 3b is formed by the extension or protruding portion. As shown in FIGS. 2 and 3, the front catch segment 3b has a convex shape in side view.

Further, a front hitting segment 6a is integrally formed in a front lower portion of the side frame 6, in such a manner that it is curved in a concave shape in side view, in conformity with the shape (convex shape) of the front catch segment 3b.

When the lifter device is in the lowered position illustrated in FIG. 3, the front hitting segment 6a is located opposed to and spaced apart from the front catch segment 3b of the front bracket 3 by a gap t1. Further, when the lifter device is in the lifted position illustrated in FIG. 2, the front hitting segment 6a is located opposed to and spaced apart from the front catch segment 3b of the front bracket 3 by a gap t3.

Comparing between the gap t1 in the lowered position of the lifter device and the gap t3 in the lifted position of the lifter device, the gap t1 in the lowered position is set to an extremely small value, whereas the gap t3 in the lifted position is apt to become greater than the gap t1 in the lowered position to some extent. However, in this lifter device, the front catch segment 3b of the front bracket 3 is formed in a convex shape, and the front hitting segment 6a of the side frame 6 is formed in a concave shape, so that an increase of the gap t3 with respect to the gap t1 is suppressed. This makes it possible to effectively reduce an amount of frontward displacement of the seat cushion due to a deformation of the front and rear links 11, 12 in the event of a frontal collision of the vehicle, to enhance occupant safety.

More specifically, the front hitting segment 6a of the side frame 6 is formed such that a portion of the segment 6a to be located closest to the front catch segment 3b in the lowered position illustrated in FIG. 3 becomes most largely concave, and a portion of the segment 6a rearward of the concave portion protrudes downwardly. In this manner, the front hitting segment 6a is formed in a shape which is curved in conformity with the front catch segment 3b. Thus, even if the lifter device is displaced to the lifted position according to a swing movement of the front and rear links 11, 12, and thereby a height position of the side frame 6 becomes higher as shown in FIG. 2, the gap t3 to be defined in the lifted position is not significantly increased as compared with the gap t1 in the lowered position of the lifter device (FIG. 3). This makes it possible to minimize an amount of displacement of the side frame 6 occurring when the front and rear links 11, 12 are deformed during a frontal collision, to effectively reduce acceleration to be applied to an occupant.

If the front hitting segment 6a of the side frame 6 is formed in an extreme concave shape (i.e., the rear portion of the front hitting segment 6a is formed to excessively protrude downwardly) as it is attempted to immoderately reduce the gap t3 in the lifted position, the side frame 6 is likely to interfere with the front bracket 3, during a course of the displacement of the lifter device from the lowered position to the lifted position according to the swing movement of the front and rear lifters 11, 12. The gap t3 is set to a minimum value without causing the interference.

As above, in this embodiment, the curved shape of the front hitting segment 6a is set such that, during a frontal collision, an amount of displacement of the front hitting segment 6a of the side frame 6 until it is caught and stopped by the front catch segment 3b of the front bracket 3, is reduced, i.e., a gap (t1, t3, etc.) between the front catch segment 3b and the front hitting segment 6a continually becomes a shortest distance, irrespective of whether the lifter device is in the lowered position or in the lifted position (or in an intermediate position therebetween).

A rear portion of the rear bracket 4 is formed in a shape lowering obliquely rearwardly in side view, and a rear catch segment 4a (see FIG. 1) is integrally formed in an upper end of the rear portion, i.e., a rear upper portion of the rear bracket 4, to protrude laterally (inwardly in the widthwise direction of the seat). Specifically, a wall plate of the rear upper portion of the rear bracket 4 is largely extended to protrude to a position inward of the rear link 12 in the widthwise direction of the seat, and the rear catch segment 4a is formed by the extension (protruding) portion. As shown in FIGS. 2 and 3, the rear catch segment 4a has a convex shape in side view.

Further, a rear hitting segment 6b is integrally formed in a rear lower portion of the side frame 6, in such a manner that it is curved in a concave shape in side view, in conformity with the shape (convex shape) of the rear catch segment 4a.

When the lifter device is in the lowered position illustrated in FIG. 3, the rear hitting segment 6b is located opposed to and spaced apart from the rear catch segment 4a of the rear bracket 4 by a gap t2. Further, when the lifter device is in the lifted position illustrated in FIG. 2, the rear hitting segment 6b is located opposed to and spaced apart from the rear catch segment 4a of the rear bracket 4 by a gap t4.

The rear catch segment 4a of the rear bracket 4 is formed in a convex shape, and the rear hitting segment 6b of the side frame 6 is formed in a concave shape, as described above, so that the gap t4 in the lifted position is not significantly increased with respect to the gap t2 in the lowered position. This makes it possible to effectively reduce an amount of rearward displacement of the seat cushion due to a deformation of the front and rear links 11, 12 in the event of a rear collision of the vehicle, to enhance the occupant safety.

More specifically, the rear hitting segment 6b of the side frame 6 is formed in a concave shape conforming with the convex shape of the rear catch segment 4a, so that, even if the lifter device is displaced from the lowered position to the lifted position and thereby the height position of the side frame 6 becomes higher (FIG. 2), the gap t4 to be defined in the lifted position is not significantly increased as compared with the gap t2 in the lowered position (FIG. 3), as in the case of the front catch segment 3b and the front hitting segment 6a. Thus, even in if the front and rear links 11, 12 are deformed by an impact force during a rear collision, and the rear hitting segment 6b of the side frame 6 is displaced rearwardly to a position where it is brought into contact with the rear catch segment 4a of the rear bracket 4, an amount of displacement of the side frame 6 can be minimized to effectively reduce acceleration to be applied to an occupant.

As above, in this embodiment, the curved shape of the rear hitting segment 6b is set such that, during a rear collision, an amount of displacement of the rear hitting segment 6b of the side frame 6 until it is caught and stopped by the rear catch segment 4a of the rear bracket 4, is reduced, i.e., a gap (t2, t4, etc.) between the rear catch segment 4a and the rear hitting segment 6b continually becomes a shortest distance, irrespective of whether the lifter device is in the lowered position or in the lifted position (or in an intermediate position therebetween).

In the above embodiment of the present invention, the concave-shaped front hitting segment 6a conforming with the shape of the front catch segment 3b of the front bracket 3, and the rear hitting segment 6b conforming with the shape of the rear catch segment 4a of the rear bracket 4, are provided in respective ones of the front portion and the rear portion of the side frame 6, to minimize a gap (t1, t3, etc.) between the front catch segment 3b and the front hitting segment 6a and a gap (t2, t4, etc.) between the rear catch segment 4a and the rear hitting segment 6b, irrespective of whether the lifter device is in the lowered position or in the lifted position (or in an intermediate position therebetween).

Thus, for example, when the side frame 6 is displaced frontwardly along with a deformation of the front and rear links 11, 12 due to an impact force during a frontal collision, and the front hitting segment 6a of the side frame 6 is caught and stopped by the front catch segment 3b of the front bracket 3, an amount of displacement of the side frame 6 is effectively suppressed, irrespective of the lifted/lowered position of the lifter device.

In the same manner, when the side frame 6 is displaced rearwardly along with a deformation of the front and rear links 11, 12 due to an impact force during a rear collision, and the rear hitting segment 6b of the side frame 6 is caught and stopped by the rear catch segment 4a of the rear bracket 4, an amount of displacement of the side frame 6 is effectively suppressed.

As above, in the event of an unexpected accident such as a frontal or rear collision, an amount of displacement of the seat cushion is minimized, so that acceleration to be applied to an occupant can be reduced to enhance the occupant safety.

As one aspect different from the above embodiment, the acceleration to be applied to an occupant may be reduced by considerably increasing rigidity of the links 11, 12 to take measures to prevent the links 11, 12 from being deformed during a frontal or rear collision. However, such measures involve a problem that the links 11, 12 are inevitably increased in size or wall thickness, resulting in an increase in weight thereof. In contrast, when an amount of displacement of the seat cushion is reduced by narrowing the gaps t1 to t4 between the side frame 6 and each of the brackets 3, 4, as in the above embodiment, the need for immoderately increasing the rigidity of the links 11, 12 can be eliminated to facilitate a reduction in size and weight of the links 11, 12.

In addition, each of the catch segments 3b, 4a of the brackets 3, 4 has a convex shape in side view, and each of the hitting segments 6a, 6b of the side frame 6 has a concave shape in side view, so that the catch segments 3b, 4a and the hitting segments 6a, 6b can be formed in a simple manner.

Further, the catch segments 3b, 4a can be integrally formed in respective ones of the brackets 3, 4, and the hitting segments 6a, 6b can be integrally formed in the side frame 6, so that the brackets 3, 4 and the side frame 6 can be produced by slight modification to facilitate a reduction in cost.

Figure 4:
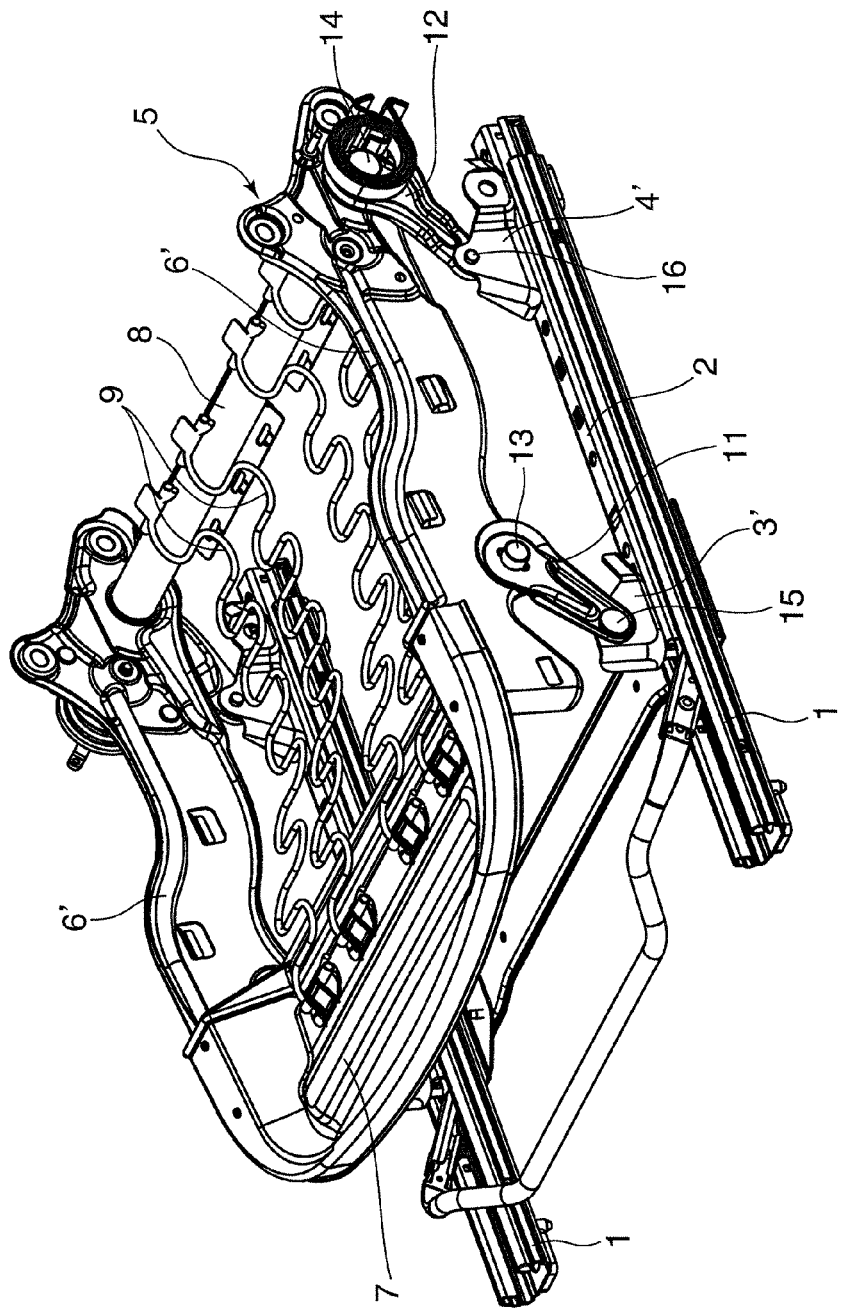
FIG. 4 is a perspective view of a vehicle seat having a lifter device as a comparative example for comparison with the present invention.

FIG. 4 is a perspective view of a lifter device illustrated for comparison with FIG. 1. In this type of lifter device, a front bracket 3' is devoid of the front the front catch segment 3b, and a rear bracket 4' is devoid of the rear catch segment 4a.

Further, a side frame 6' is devoid of the front hitting segment 6a and the rear hitting segment 6b.

In this type of lifter device, it is difficult to catch and stop a frontward or rearward displacement of the side frame 6' by the front or rear brackets 3', 4', and it is necessary to additionally provide stopper means or the like.

In the tail of the description, a structure and an effect of the above vehicle seat lifter device will be summarized.

A lifter device for a vehicle seat is designed to lift and lower a seat cushion with respect to a floor member provided on a floor of a vehicle body. The lifter device includes: a pair of front and rear links each coupling a side frame of the seat cushion and the floor member; a front bracket and a rear bracket each of which is fixed to the floor member and to which respective lower ends of the front link and the rear link are swingably coupled; a front hitting segment formed in a front portion of the side frame and located in spaced-apart relation to a front catch segment formed in the front bracket, wherein the front hitting segment has a shape conforming with that of the front catch segment; and a rear hitting segment formed in a rear portion of the side frame and located in spaced-apart relation to a rear catch segment formed in the rear bracket, wherein the rear hitting segment has a shape conforming with that of the rear catch segment. In the lifter device, when the side frame is displaced in the frontward direction along with a deformation of the front and rear links due to an impact force during a frontal collision, the front hitting segment of the side frame is caught and stopped by the front catch segment of the front bracket, and, when the side frame is displaced in the rearward direction along with a deformation of the front and rear links due to an impact force during a rear collision, the rear hitting segment of the side frame is caught and stopped by the rear catch segment of the rear bracket.

In the above embodiment, when the side frame is displaced frontwardly along with a deformation of the front link and the rear link due to an impact force during a frontal collision, and the front hitting segment of the side frame is caught and stopped by the front catch segment of the front bracket, an amount of displacement of the side frame is effectively suppressed, irrespective of the lifted/lowered position of the lifter device. In the same manner, when the side frame is displaced rearwardly along with a deformation of the front and rear links due to an impact force during a rear collision, and the rear hitting segment of the side frame is caught and stopped by the rear catch segment of the rear bracket, an amount of displacement of the side frame is effectively suppressed.

As above, in the event of an unexpected accident such as a frontal or rear collision, an amount of displacement of the seat cushion is minimized, so that acceleration to be applied to an occupant can be reduced to enhance occupant safety.

In addition, a need for immoderately increasing rigidity of the front link and the rear link can be eliminated to facilitate a reduction in size and weight of the links.

Preferably, in the above lifter device, the front catch segment of the front bracket and the front hitting segment of the side frame are located in spaced-apart relation at a shortest distance, and the rear catch segment of the rear bracket and the rear hitting segment of the side frame are located in spaced-apart relation at a shortest distance.

This makes it possible to further enhance the safety during a frontal or rear collision.

Preferably, in the above lifter device, the front catch segment is formed in a rear upper portion of the front bracket located rearward of a coupling position between the front bracket and the lower end of the front link, to have a convex shape in side view, and the front hitting segment is formed in a front lower portion of the side frame to have a concave shape in side view which conforms with the shape of the front catch segment. Further, it is preferable that the rear catch segment is formed in a rear upper portion of the rear bracket located rearward of a coupling position between the rear bracket and the lower end of the rear link, to have a convex shape in side view, and the rear hitting segment is formed in a rear lower portion of the side frame to have a concave shape in side view which conforms with the shape of the rear catch segment.

In this case, each of the catch segments of the brackets has a convex shape in side view, and each of the hitting segments of the side frame has a concave shape in side view, so that the catch segments and the hitting segments can be formed in a simple manner.

Preferably, in the above lifter device, the front catch segment and the rear catch segment are integrally formed in the front bracket and the rear bracket, respectively, and the front hitting segment and the rear hitting segment are integrally formed in the side frame.

In this case, the catch segments can be integrally formed in corresponding ones of the brackets, and the hitting segments can be formed in the side frame, so that the brackets and the side frame can be produced by slight modification to facilitate a reduction in cost.

This application is based on Japanese patent application serial No. 2009-177299, filed in Japan Patent Office on Jul. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lifter device and vehicle seat combination, designed to lift and lower a seat cushion with respect to a floor member provided on a floor of a vehicle body, comprising:
   a pair of front and rear links each coupling a side frame of the seat cushion and the floor member;
   a front bracket and a rear bracket each of which is fixed to the floor member and to which respective lower ends of the front link and the rear link are swingably coupled;
   a front hitting segment formed in a front portion of the side frame and located in spaced-apart relation to a front catch segment formed in the front bracket, the front hitting segment having a shape conforming with that of the front catch segment; and
   a rear hitting segment formed in a rear portion of the side frame and located in spaced-apart relation to a rear catch segment formed in the rear bracket, the rear hitting segment having a shape conforming with that of the rear catch segment,
   wherein:
   when the side frame is displaced in the frontward direction along with a deformation of the front and rear links due to an impact force during a frontal collision, the front hitting segment of the side frame is caught and stopped by the front catch segment of the front bracket; and
   when the side frame is displaced in the rearward direction along with a deformation of the front and rear links due to an impact force during a rear collision, the rear hitting segment of the side frame is caught and stopped by the rear catch segment of the rear bracket.

2. The lifter device and vehicle seat combination as defined in claim 1, wherein the front catch segment of the front bracket and the front hitting segment of the side frame are located in spaced-apart relation at a shortest distance, and the rear catch segment of the rear bracket and the rear hitting segment of the side frame are located in spaced-apart relation at a shortest distance.

3. The lifter device and vehicle seat combination as defined in claim 1, wherein:
   the front catch segment is formed in a rear upper portion of the front bracket located rearward of a coupling position between the front bracket and the lower end of the front link, to have a convex shape in side view;
   the front hitting segment is formed in a front lower portion of the side frame to have a concave shape in side view which conforms with the shape of the front catch segment;
   the rear catch segment is formed in a rear upper portion of the rear bracket located rearward of a coupling position between the rear bracket and the lower end of the rear link, to have a convex shape in side view; and
   the rear hitting segment is formed in a rear lower portion of the side frame to have a concave shape in side view which conforms with the shape of the rear catch segment.

4. The lifter device and vehicle seat combination as defined in claim 1, wherein:
   the front catch segment is integrally formed in the front bracket;
   the rear catch segment is integrally formed in the rear bracket; and
   the front hitting segment and the rear hitting segment are integrally formed in the side frame.

* * * * *